April 7, 1942.  J. W. DAWSON  2,278,430
RAPID CONDENSER WELDING SYSTEM
Filed Feb. 5, 1940    2 Sheets-Sheet 1
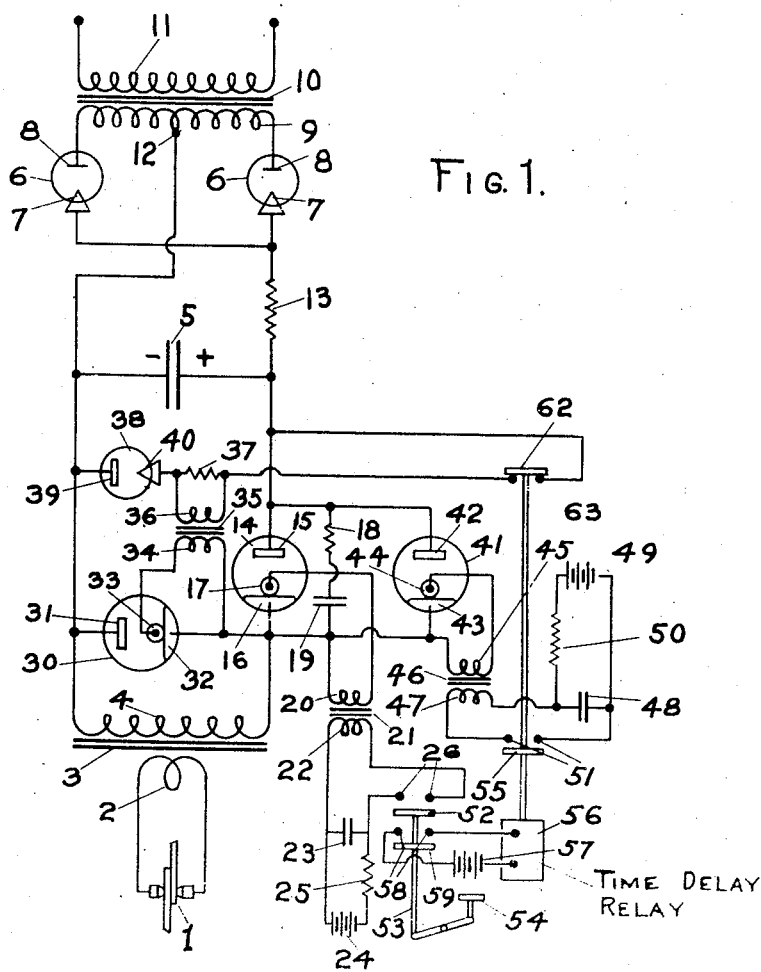
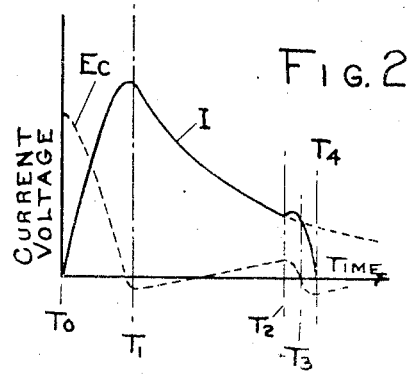
INVENTOR.
JOHN W. DAWSON,
BY Elmer J. Gom
ATTY.

April 7, 1942.  J. W. DAWSON  2,278,430
RAPID CONDENSER WELDING SYSTEM
Filed Feb. 5, 1940  2 Sheets—Sheet 2
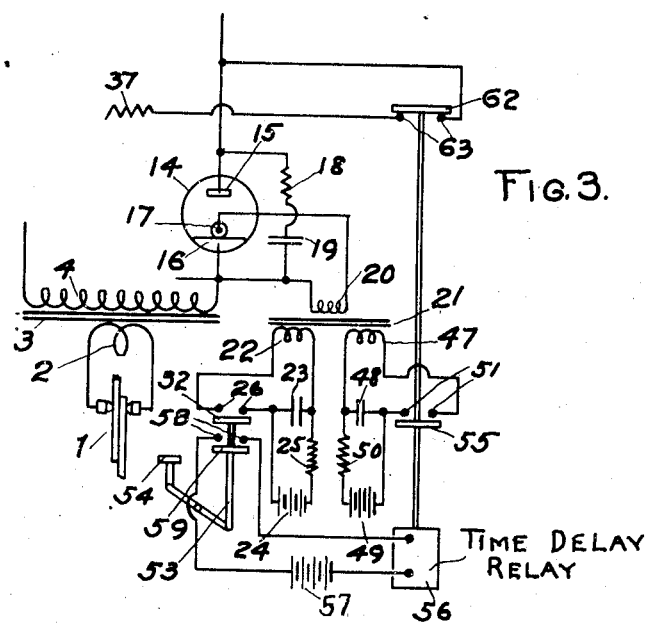
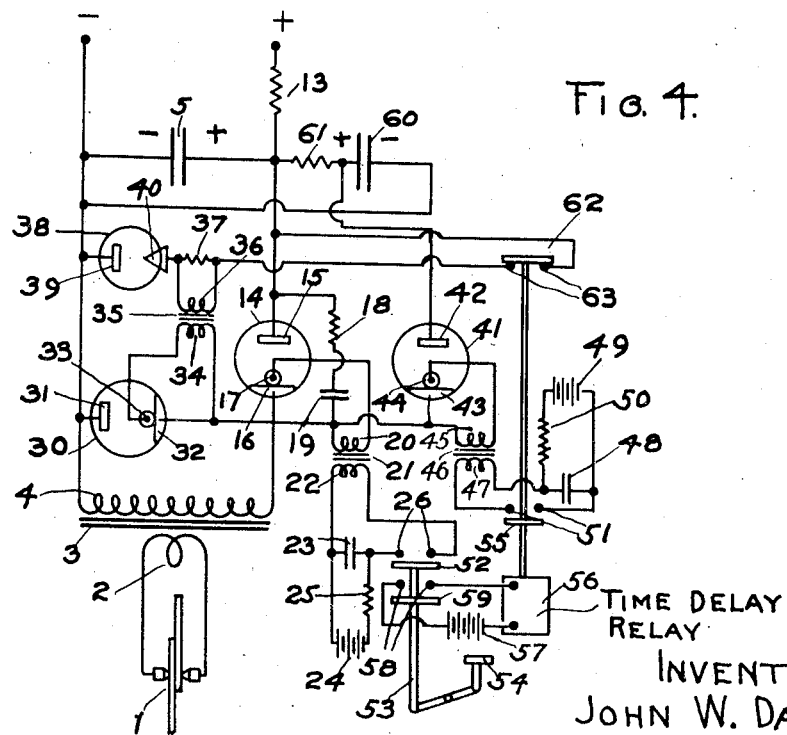
INVENTOR.
JOHN W. DAWSON,
BY Elmer J. Gorn
ATTY.

Patented Apr. 7, 1942

2,278,430

UNITED STATES PATENT OFFICE 2,278,430

RAPID CONDENSER WELDING SYSTEM

John W. Dawson, Auburndale, Mass., assignor to Raytheon Manufacturing Company, Newton, Mass., a corporation of Delaware Application February 5, 1940, Serial No. 317,354

21 Claims. (Cl. 219—4)

This invention relates to welding systems in which electrical energy is stored in a condenser and then discharged into a welding load circuit in order to deliver welding current to a resistance welding load. As described and claimed in my copending application, Serial No. 309,124, filed December 14, 1939, for an improvement in Condenser welding system, such systems may be made to deliver a substantially unidirectional pulse of current to the welding load. In systems of this kind there is often a relatively long period of decay of the current. It is often desirable for various purposes to stop the current flow in the welding load in a shortened period of time.

An object of this invention is to terminate the decay current in systems of the above type at any desired time.

Another object is to accomplish the foregoing in a simple and reliable manner.

The foregoing and other objects of this invention will be best understood from the following description of exemplifications thereof, reference being had to the accompanying drawings, wherein:

Fig. 1 is a diagram of a condenser welding system embodying my invention;

Fig. 2 is a set of curves illustrating the mode of operation of my invention;

Fig. 3 is a diagram illustrating a modified form of the arrangement shown in Fig. 1; and Fig. 4 is a diagram illustrating a still further modification of the present invention.

In the arrangement shown in Fig. 1, welding current is to be supplied to a resistance welding load 1 from the secondary winding 2 of the welding transformer 3 provided with a primary winding 4. The welding load 1 may be of the usual type consisting of a pair of electrodes which engage the work to be welded. The energy necessary to accomplish welding is adapted to be supplied to the primary winding 4 from a condenser 5. This condenser is adapted to be charged from any suitable source of current, such as a direct current generator, battery, rectifier, or the like. In Fig. 1 the direct current is shown as being supplied from a pair of rectifier tubes 6. These tubes may be of the gas or vapor-filled type having permanently-energized cathodes 7. These cathodes may be thermionic filaments or any other suitable type of cathode. The rectifier tubes 6 are provided with anodes 8 which are connected to opposite sides of the secondary winding 9 of a charging transformer 10 whose primary winding 11 is adapted to be connected to a suitable source of alternating current. The secondary winding 9 is provided with a center tap 12 which is connected to the negative side of the condenser 5. The two cathodes are connected together through an impedance 13 to the positive side of the condenser 5. The impedance 13 is preferably a resistance, and is of a value to maintain the proper charging rate for the condenser 5. Thus when the primary winding 11 is energized, charging current is supplied to the condenser 5, which thereupon is charged to a predetermined voltage.

The condenser 5 is adapted to be discharged through the primary winding 4. For this purpose the negative side of said condenser is connected to the left end of primary winding 4, and the positive side of said condenser is connected through a controlled ignition discharge tube 14 to the right end of said primary winding. The tube 14 is preferably of the pool cathode type with an igniter for initiating a cathode spot on the pool in order to cause the tube to conduct current. The tube 14 is provided with an anode 15 connected to the positive side of the condenser 5, and with a pool cathode 16, preferably of mercury, connected to the right end of the primary winding 4. The tube 14 is also provided with an igniter 17. Although this igniter may be of any suitable type, it preferably is of the electrostatic type consisting of a conductor separated and insulated from the cathode by a thin glass layer. In order to insure reliable starting for the tube 14, a resistance 18 in series with the condenser 19 is preferably connected across said tube. In order to supply the igniter 17 with an igniting impulse for initiating a discharge in the tube 14, a secondary winding 20 of an igniting transformer 21 is connected between the igniter 17 and its associated cathode 16. The igniting transformer 21 is provided with a primary winding 22. This primary winding is adapted to be supplied with a pulse of current for igniting purposes from a condenser 23 which may be suitably charged from a source of direct current, such as a battery 24, in series with a current-limiting resistance 25. A pair of contacts 26 is interposed between the primary winding 22 and the condenser 23. When the contacts 26 are closed, the condenser 23 discharges through the primary winding, delivering an igniting impulse to the igniter 17.

In order to establish a shunt path for the decay of current in the welding circuit, as described and claimed in my copending application referred to above, another controlled ignition discharge tube 30 is provided. This tube is preferably of the same type as the tube 14, and is provided with an anode 31 connected to the left side of the primary winding 4, and with a pool cathode 32 connected to the right side of said primary winding. Tube 30 is also provided with an igniter 33, preferably of the same type as igniter 17. In order to supply the igniter 33 with igniting impulses, the secondary winding 34 of an igniting transformer 35 is connected between the igniter 33 and its associated cathode 32. The igniting transformer 35 is provided with a primary winding 36. The primary winding 36 is connected across a resistance 37 which in turn is connected in series with a rectifier tube 38 across the condenser 5. The rectifier tube 38 may be of small current-carrying capacity, but one which should withstand the negative voltage applied to the condenser 5. This tube is provided with an anode 39 connected to the negative side of the condenser 5, and with a permanently-energized type of cathode 40 connected in series with the resistance 37 to the positive side of said condenser. Due to the polarity of the above connections, when the condenser 5 is initially charged from the rectifier tube 6, the voltage which is impressed on the tube 38 is in the non-conducting direction, and therefore said tube does not conduct current.

In order to cut off the current when it has reached a predetermined value, as will be explained below, an additional controlled ignition discharge tube 41, preferably of the same type as tubes 14 and 30, is also provided. Tube 41 has an anode 42 and a pool cathode 43 connected respectively to the anode 15 and cathode 16 of the tube 14. The tube 41 is also provided with an igniter 44, preferably of the same type as igniter 17. The secondary winding 45 of an igniting transformer 46 is connected between the igniter 44 and its associated cathode 43 for the purpose of supplying an igniting impulse thereto. The igniting transformer 46 is provided with a primary winding 47 adapted to be supplied with an igniting impulse from a condenser 48 which may suitably be charged from a source of direct current, such as a battery 49, through a current-limiting resistance 50. Interposed between the primary winding 47 and its condenser 48 is a pair of contacts 51.

The contacts 26 are adapted to be closed by an armature 52 for initiating the operation of the system. The armature 52 is carried by a push rod 53 actuated by a pushbutton 54. The contacts 51 are adapted to be closed by an armature 55 at a predetermined time interval after the closure of the contacts 26. For this purpose the armature 55 is operated by a time delay relay 56. This time delay relay is of the type which, when supplied with current, closes the contacts 51 after a predetermined time. The relay 56 is preferably adjustable in order that predetermined time delay intervals may be selected at will. The relay 56 is adapted to be actuated by current supplied from a suitable source, such as a battery 57. This battery is connected to the relay 56 through a circuit in which is interposed a pair of contacts 58. These contacts are adapted to be closed by an armature 59, likewise carried by the rod 53. The relay 56 also carries an armature 62 which in the deenergized position of the relay bridges a pair of contacts 63 interposed in the circuit of the rectifier tube 38.

The operation of the system described in Fig. 1 may be understood more clearly by referring to the curves shown in Fig. 2. The curves do not purport to show the operation of this system quantitatively, although they do represent in a general qualitative manner the nature of said operation. The solid curve I represents the current delivered from the condenser 5 to the welding load. The dotted curve Ec represents the voltage across the condenser 5. At the time T₀, the pushbutton 54 is depressed, closing the contacts 26 and 58. Closure of the contacts 26 ignites the tube 14, and therefore discharge current flows from the condenser 5 through the tube 14 to the primary winding 4. This current I rises to a maximum value, while the voltage of the condenser Ec falls to zero and tends to reverse as the current I starts to decrease from its maximum value. Due to this reversal of voltage on the condenser 5, the tube 38 conducts a pulse of current which supplies an igniting impulse through the igniting transformer 35 to the igniter 33. This initiates conduction of the tube 30 at the time T₁, which therefore establishes a relatively low impedance shunt path across the primary winding 4. Due to this shunt path, the current I after the time T₁ decreases substantially exponentially until a predetermined time T₂. The operation of the tube 30 at the time T₁ extinguishes the discharge in the tube 14. The constants of the charging circuit for the condenser 5 are so chosen that during the time interval T₁—T₂, the condenser 5 loses its reverse charge and accumulates some charge of the initial polarity. When the contacts 26 were closed, the contacts 58 were also closed, which action supplied current to the relay 56. Due to the time delay action of said relay, however, the contacts 51 did not close immediately. After a time interval, as predetermined by the setting of the relay 56, the armature 55 closes the contacts 51, and thus fires the tube 41. The time of this operation is represented in Fig. 2 at T₂. When the tube 41 fires, it connects the condenser 5 across the tube 30 in such a way as to tend to force current through said tube in the non-conducting direction. This action extinguishes the discharge in tube 30, and therefore opens the low impedance shunt path across the primary winding 4. At the same time that the contacts 51 are closed, the contacts 63 are opened so as to prevent a subsequent firing of tubes 38 and 30 after the time T₂. The constants of the condenser 5 as related to the transformer and its associated load circuit are such as to cause the condenser 5 to discharge rapidly through the primary winding 4. Therefore, the voltage Ec falls to zero at the time T₃, and thereafter builds up to some value in the opposite direction at the time T₄, at which time the current I falls to zero. The energy represented by the reversed charge on the condenser 5 is energy which was stored in the load circuit, including the transformer 3 at the time T₃. This reversed charge building up a voltage on the condenser 5 opposes the further flow of current and causes said current to fall rapidly to zero at the time T₄. Since the current I has been flowing through the tube 41, when said current falls to zero the tube 41 is extinguished. The reversal of the voltage Ec does not reignite the tube 30 because the contacts 63 remain open until after the time T₄. If the tube 41 had not been brought into operation, the current I would have continued decreasing substantially exponentially beyond the times T₂ and T₄, as shown by the dot-dash line in Fig. 2. During the time interval T₂—T₄, the voltage Ec also reverses. However, since the voltages involved in this current-extinguishing action are relatively small, the final voltage on the condenser 5 in the reverse direction is also relatively small. Thereafter the condenser 5 can recharge from the rectifier tubes 6 to its initial value when the next welding operation may be initiated.

Instead of providing a separate tube 41 for accomplishing the current-extinguishing action, the tube 14 may be caused to accomplish this action. Such an arrangement is shown in the fragmentary diagram of Fig. 3 in which a firing circuit for causing the tube 14 to perform both functions is shown. In this figure the same reference numerals are applied where the elements are the same as those of Fig. 1. In Fig. 3 the tube 41 is eliminated and the igniting transformer 21 is supplied with both primary windings 22 and 47. Therefore, after the operation of the tubes 14 and 30, as described in connection with Fig. 1, the igniting impulse, which is supplied to the primary winding 47 at the time $T_3$, restarts the tube 14, which thereupon accomplishes exactly the same action as tube 41 in Fig. 1. By the arrangement of Fig. 3, therefore, one of the tubes of Fig. 1 may be eliminated.

Instead of relying upon the recharging of condenser 5 to extinguish the tube 30 and terminate the discharge current, a separate condenser may be provided for this purpose. Such an arrangement is shown in Fig. 4 in which the same reference numerals are applied where the elements are the same as those of Fig. 1. In Fig. 4, however, a separate condenser 60 in series with an impedance 61, which may be a resistance, is connected across the condenser 5 and thus likewise across the supply of direct charging current. The anode 42 of the tube 41, instead of being connected to the positive side of the condenser 5, is connected to the positive side of the condenser 60. In this way the impedance 61 is interposed between the anode 42 and the positive side of the condenser 5. The operation of the arrangement shown in Fig. 4 is very similar to that described in connection with Fig. 1. However, at the time $T_2$, it is not necessary for the condenser 5 to have acquired any particular charge inasmuch as the voltage of the condenser 60 upon the firing of the tube 41 is impressed across the tube 30 to extinguish it. Also the constants of the condenser 60 as related to the load circuit is such as to cause a rapid discharge of said condenser and substantially the same rapid cutting off of the current I, as illustrated in Fig. 2.

Of course it is to be understood that this invention is not limited to the particular details as described above as many equivalents will suggest themselves to those skilled in the art. Other arrangements for extinguishing the current I at a predetermined time may be devised. Also other types of discharge tubes or circuit-connecting means may be utilized instead of the tubes shown. Various other ideas as to the utilization of the principles enunciated and claimed herein will suggest themselves to those skilled in the art. It is accordingly desired that the appended claims be given a broad interpretation commensurate with the scope of the invention within the art.

What is claimed is:

1. A welding system comprising a condenser, means for charging said condenser, a welding load, means for discharging said condenser into said load with a pulse of current having a relatively extended decay period, and means for substantially increasing the rate of decay of said current when it has fallen to a relatively low value, for causing said current to flow for a shortened time at said increased rate of decay and for cutting off said current at the end of said shortened time.

2. A welding system comprising a condenser, means for charging said condenser, a welding load, means for discharging said condenser into said load, and means for cutting off the flow of said discharge current at a predetermined time interval after the initiation of said discharging means.

3. A welding system comprising electrical energy storage means, means for storing energy in said storage means, a welding load, means for discharging the energy from said storage means into said load with a pulse of current having a relatively extended decay period, and means for substantially increasing the rate of decay of said current when it has fallen to a relatively low value, for causing said current to flow for a shortened time at said increased rate of decay and for cutting off said current at the end of said shortened time.

4. A welding system comprising electrical energy storage means, means for storing energy in said storage means, a welding load, means for discharging the energy from said storage means to said load, and means for cutting off the flow of said discharge current at a predetermined time interval after the initiation of said discharging means.

5. A welding system comprising a condenser, means for charging said condenser, a welding load, means for discharging said condenser into said load, means which becomes active upon substantial discharge of said condenser for establishing a shunt circuit across the input to said load, and means for opening said shunt circuit and reestablishing current flow between said load and said condenser when said current has fallen to a relatively low value, the constants of the condenser discharge circuit thus established being such that said current flow quickly terminates.

6. A welding system comprising a condenser, means for charging said condenser, a welding load, means for discharging said condenser into said load, means which becomes active upon substantial discharge of said condenser for establishing a shunt circuit across the input to said load, and means for opening said shunt circuit and reestablishing current flow between said load and said condenser at a predetermined time interval after the initiation of said discharge means, the constants of the condenser discharge circuit thus established being such that said current flow quickly terminates.

7. A welding system comprising a condenser, means for charging said condenser, a welding load, means for discharging said condenser into said load, means which becomes active upon substantial discharge of said condenser for establishing a shunt circuit across the input to said load and stopping the discharge of said condenser, and means for opening said shunt circuit and reestablishing current flow between said load and condenser when said current has fallen to a relatively low value, the constants of the condenser discharge circuit thus established being such that said current flow quickly terminates.

8. A welding system comprising a condenser, means for charging said condenser, a welding load, means for discharging said condenser into said load, means which becomes active upon substantial discharge of said condenser for establishing a shunt circuit across the input to said load and stopping the discharge of said condenser, and means for opening said shunt circuit and reestablishing current flow between said load and condenser at a predetermined time interval after the initiation of said discharge means, the constants of the condenser discharge circuit thus established being such that said current flow quickly terminates.

9. A welding system comprising a condenser, means for charging said condenser, a welding load, means for discharging said condenser into said load with a pulse of current, having a relatively extended decay period and additional condenser means which comes into operation when the flow of said current has fallen to a relatively low value for cutting off the flow of said current.

10. A welding system comprising a condenser, means for charging said condenser, a welding load, means for discharging said condenser into said load with a pulse of current, having a relatively extended decay period and additional condenser means for cutting off the flow of said current at a predetermined time interval after the initiation of said discharging means.

11. A welding system comprising a condenser, means for charging said condenser, a welding load, means for discharging said condenser into said load, controlled ignition space discharge means which becomes active upon substantial discharge of said condenser for establishing a shunt circuit across the input to said load and stopping the discharge of said condenser, additional condenser means adapted to be charged, and means for connecting said additional condenser means across said space discharge means for extinguishing said space discharge means when said current has fallen to a relatively low value.

12. A welding system comprising a condenser, means for charging said condenser, a welding load, means for discharging said condenser into said load, controlled ignition space discharge means which becomes active upon substantial discharge of said condenser for establishing a shunt circuit across the input to said load and stopping the discharge of said condenser, additional condenser means adapted to be charged, and means for connecting said additional condenser means across said space discharge means for extinguishing said space discharge means at a predetermined time interval after the initiation of said condenser discharging means.

13. A welding system comprising a condenser, means for charging said condenser, a welding load, means for connecting said condenser to said load to transfer energy between said condenser and said load, and means for interrupting said transfer of energy at a predetermined time interval after the initial operation of said connecting means.

14. A welding system comprising a condenser, means for charging said condenser with a predetermined polarity, a welding load circuit, means for discharging said condenser into said load circuit with a pulse of current, having a relatively extended decay period and means for feeding energy stored in said load circuit into said condenser when said pulse of current has fallen to a relatively low value, said energy being fed into said condenser in such a direction as to cause the decrease of said current pulse to be accelerated.

15. A welding system comprising a condenser, means for charging said condenser with a predetermined polarity, a welding load circuit, means for discharging said condenser into said load circuit with a substantially unidirectional pulse of current, means for feeding energy stored in said load circuit into said condenser, and means for initiating the operation of said last-named means at a predetermined time interval after the initiation of the operation of said discharging means.

16. A welding system comprising a condenser, means for charging said condenser with a predetermined polarity, a welding load circuit including a welding load, means for discharging said condenser into said load circuit with a pulse of current, having a relatively extended decay period and means for feeding energy stored in said load circuit into said condenser when said pulse of current had fallen to a relatively low value, said energy being fed into said condenser in such a direction as to cause the decrease of said current pulse to be accelerated.

17. A welding system comprising a condenser, means for charging said condenser with a predetermined polarity, a welding load circuit, means for discharging said condenser into said load circuit, means for feeding energy stored in said load circuit into said condenser, and means for initiating the operation of said last-named means at a predetermined time interval after the initiation of the operation of said discharging means.

18. A welding system comprising a condenser, means for charging said condenser with a predetermined polarity, a welding load circuit, means for discharging said condenser into said load circuit with a pulse of current, means for normally preventing substantial return of energy from said load to said condenser, and means for feeding energy stored in said load circuit into said condenser when said pulse of current has fallen to a relatively low value.

19. A welding system comprising a condenser, means for charging said condenser with a predetermined polarity, a welding load circuit, means for discharging said condenser into said load circuit with a pulse of current, means for normally preventing substantial return of energy from said load to said condenser, and means for feeding energy stored in said load circuit into said condenser subsequent to the initiation of said discharging means.

20. A welding system comprising a condenser, means for charging said condenser, an inductive welding load which together with said condenser tends to comprise an oscillating circuit, means for connecting said condenser to said load to transfer energy between said condenser and said load, means for thereafter trapping said energy in said load, and means for releasing at a selectable later time so much of said energy as remains undissipated in said load and for causing said remaining energy to return to the condenser to interrupt said transfer of energy at a predetermined time interval after the initial operation of said connecting means.

21. A welding system comprising a condenser, means for charging said condenser with a predetermined polarity, a welding load circuit, electronic means for discharging said condenser into said load circuit, including means for preventing the return of energy from said welding load to said condenser, means for feeding energy stored in said load circuit into said condenser, and means for initiating the operation of said last-named means at a predetermined time interval after the initiation of the operation of said discharging means when a pre-selected substantial portion of said energy has been absorbed in said welding load.

JOHN W. DAWSON.